United States Patent
Haschka et al.

(10) Patent No.: US 11,029,663 B2
(45) Date of Patent: Jun. 8, 2021

(54) METHOD AND DEVICE FOR AUTOMATICALLY GENERATING A PRODUCTION MACHINE OR MACHINE TOOL CONTROL PROGRAM WHICH IS SOLELY DESIGNED FOR DIAGNOSTIC PURPOSES

(71) Applicant: SIEMENS AKTIENGESELLSCHAFT, Munich (DE)

(72) Inventors: Markus Stephan Haschka, Karlsruhe (DE); Elmar Schäfers, Fürth (DE); Torsten Schür, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 52 days.

(21) Appl. No.: 16/607,300

(22) PCT Filed: Apr. 23, 2018

(86) PCT No.: PCT/EP2018/060283
§ 371 (c)(1),
(2) Date: Oct. 22, 2019

(87) PCT Pub. No.: WO2018/197382
PCT Pub. Date: Nov. 1, 2018

(65) Prior Publication Data
US 2020/0301395 A1    Sep. 24, 2020

(30) Foreign Application Priority Data
Apr. 25, 2017   (EP) .................................. 17167862

(51) Int. Cl.
G05B 19/408     (2006.01)
G05B 19/19      (2006.01)
G05B 19/4093    (2006.01)

(52) U.S. Cl.
CPC ......... *G05B 19/4083* (2013.01); *G05B 19/19* (2013.01); *G05B 19/4093* (2013.01)

(58) Field of Classification Search
None
See application file for complete search history.

(56) References Cited

U.S. PATENT DOCUMENTS

2004/0239276 A1* 12/2004 Ladra .................. G05B 19/416
                                                       318/569
2008/0215164 A1*  9/2008 Denk ..................... G05B 19/19
                                                       700/29

(Continued)

FOREIGN PATENT DOCUMENTS

EP     2 690 513 A1    1/2014

OTHER PUBLICATIONS

PCT International Search Report and Written Opinion of International Searching Authority dated Jul. 11, 2019 corresponding to PCT International Application No. PCT/EP2018/060283 filed Apr. 23, 2018.

*Primary Examiner* — Ryan A Jarrett
(74) *Attorney, Agent, or Firm* — Henry M. Feireisen LLC

(57) ABSTRACT

A method and a device operating according to the method automatically generate a control program designed for diagnostic purposes of a production machine or machine tool. The control program is generated using freely selectable parameters and/or machine-specific parameters by an algorithm which defines a movement profile. The movement profile incorporates at least one test run for at least one axis of the respective production machine or machine tool, wherein the at least one test run produces an axis excitation (Continued)

which is suitable for determining at least one mechatronic characteristic variable of the respective axis.

7 Claims, 4 Drawing Sheets

(56) References Cited

U.S. PATENT DOCUMENTS

| | | | | |
|---|---|---|---|---|
| 2011/0254495 | A1* | 10/2011 | Barkman | G05B 19/401 |
| | | | | 318/561 |
| 2019/0018390 | A1* | 1/2019 | Bitterolf | G05B 19/401 |
| 2020/0192326 | A1* | 6/2020 | Kubik | G05B 19/4065 |

* cited by examiner

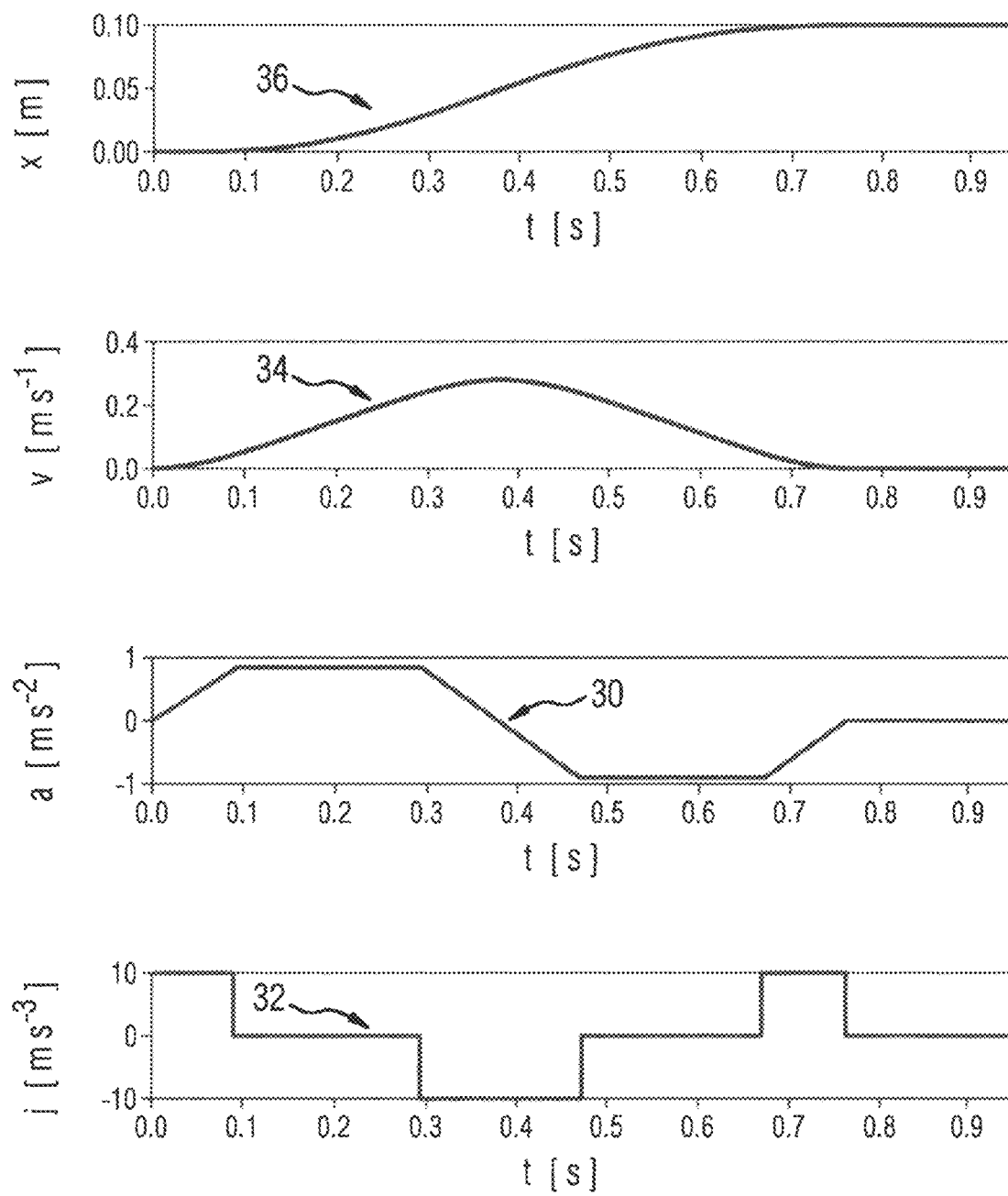

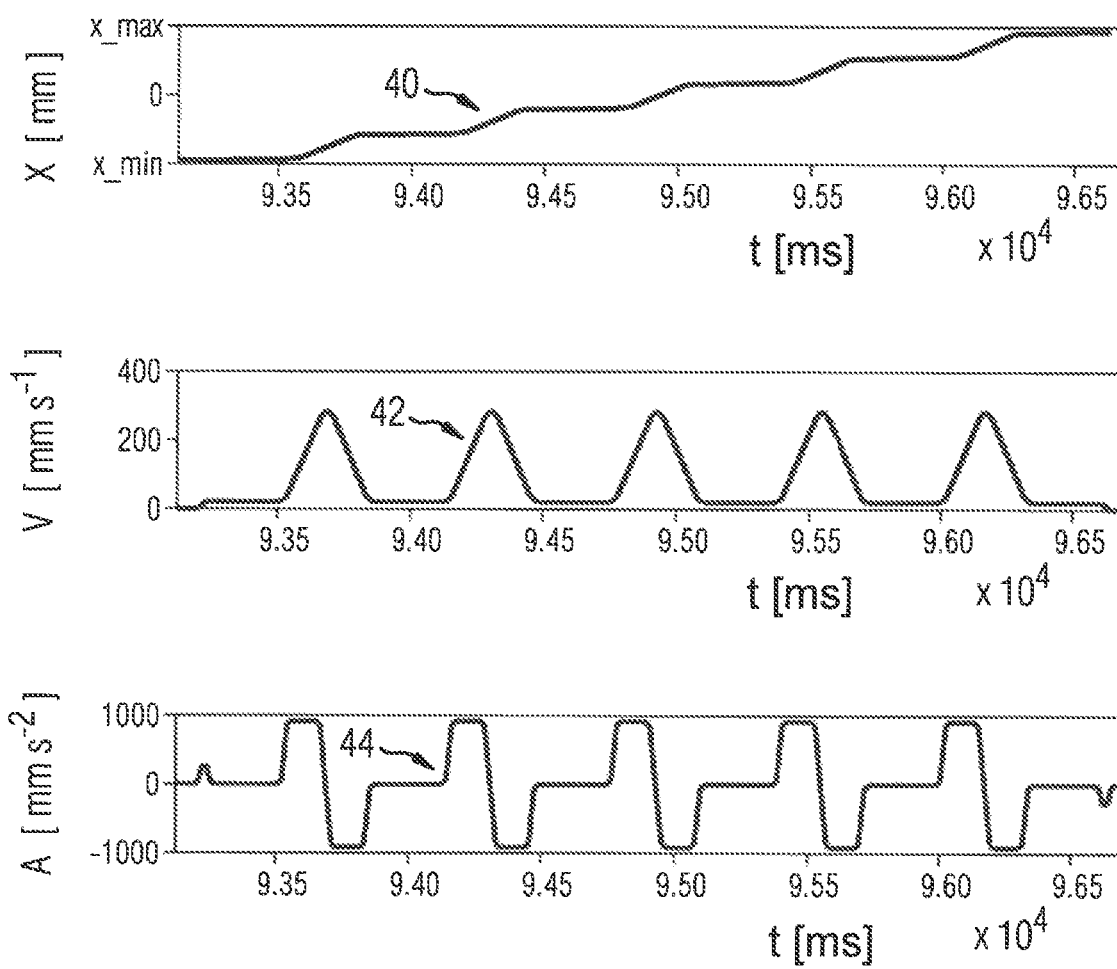

METHOD AND DEVICE FOR AUTOMATICALLY GENERATING A PRODUCTION MACHINE OR MACHINE TOOL CONTROL PROGRAM WHICH IS SOLELY DESIGNED FOR DIAGNOSTIC PURPOSES

CROSS-REFERENCES TO RELATED APPLICATIONS

This application is the U.S. National Stage of International Application No. PCT/EP2018/060283, filed Apr. 23, 2019, which designated the United States and has been published as International Publication No. WO 2018/197382 A1 and which claims the priority of European Patent Application, Serial No. 17167862.6, filed Apr. 25, 2017, pursuant to 35 U.S.C. 119(a)-(d).

BACKGROUND OF THE INVENTION

The invention relates to a method and a device which operates according to the method for automatically generating a control program for a production machine or machine tool. The generated control program is solely designed for diagnostic purposes and thus expressly not for the manufacture or processing of a workpiece or the like.

A production machine or machine tool is generally understood to mean a program-controlled automation system and thus, for example, also an industrial robot. Here and hereinafter the term production machine or machine tool is used as a generic term for terms such as machine tool, industrial robot and the like. As is well known, all machines which, inter alia, are used in mechanical engineering and in tool making for the processing of workpieces with tools are designated as machine tools. Machine tools also include so-called NC or CNC machines. As is well known, an industrial robot is a universal, programmable machine which, besides the processing of workpieces, is also intended and set up for the operation of workpieces and for assembly purposes.

A favorable excitation of a feed axis of a production machine or machine tool of the aforementioned type which is sometimes also only referred to in short hereinafter as a machine for determining at least one so-called mechatronic characteristic variable is to be achieved by means of the control program which is to be automatically generated and is solely designed for diagnostic purposes.

A mechatronic characteristic variable of a feed axis of such a machine describes, for example, a rigidity of the drive train of the feed axis over the travel distance, a play of the components encompassed by the feed axis (spindle nut, guide shoes, etc.), friction effects in such components, synchronization errors with regard to a fundamental period of the component and so on.

Based on a consideration of the present invention, it follows that in principle it is technically possible to determine such mechatronic characteristic variables from defined movements of machine axes of a program-controlled production machine or machine tool.

In the previously unpublished European patent application 15197610.7 (title: Mechatronic fingerprint of a machine by control system; inventor: Messrs. Forster, Schäfers, Bitterolf and Schür), an opportunity for determining mechatronic characteristic variables is described. According to this, a mechatronic fingerprint is expressed in physical variables of components or systems. On the control side—as is already the case today—measurement data is determined during operation or outside production by means of identification measurements. From these measurements the control then calculates the physical variables which precisely describe a component (for example, a ball screw drive) or a system (for example, a drive train, a tool magazine) with regard to certain physical properties. This earlier application is hereby incorporated in full in the description presented here, also for the purpose of including features described in this application in claims for defining the invention underlying the description presented here.

According to the current state of knowledge, an automatic generation of a control program for a production machine or machine tool of the aforementioned type which is solely designed for diagnostic purposes, namely for determining at least one mechatronic characteristic variable of a feed axis of such a machine, has not been considered hitherto.

An object of the present invention accordingly consists in providing an opportunity for automatically generating such a control program. Furthermore, an object of the present invention is to provide a simple and automatable opportunity for determining at least one mechatronic characteristic variable of a feed axis of a machine of the aforementioned type, wherein the at least one mechatronic characteristic variable is determined in connection with an embodiment of an automatically generated control program of the aforementioned type.

SUMMARY OF THE INVENTION

According to one aspect of the invention, the object is achieved by a method for automatically generating a control program for a production machine or machine tool which is solely designed for diagnostic purposes, wherein the control program is generated by means of an algorithm using freely selectable parameters and/or machine-specific parameters, wherein the resulting, automatically generated control program defines a movement profile, namely a movement profile with at least one test run, for at least one axis of the respective production machine or machine tool, and wherein the at least one test run (12) produces an axis excitation which is suitable for determining at least one mechatronic characteristic variable of the respective axis.

In the interests of better readability of the following description, a production machine or machine tool of the aforementioned type is sometimes referred to in short as a machine hereinafter. A feed axis of such a machine is sometimes only referred to in short as an axis or machine axis hereinafter. Furthermore, in the interests of better readability, but without sacrificing any further general validity, the description is continued in part with a description of a determination of precisely one mechatronic characteristic variable. This avoids otherwise necessary formulations such as "at least one mechatronic characteristic variable", "the or each mechatronic characteristic variable" and so on. However, hereinafter such formulations are always to be read with each mention of precisely one mechatronic characteristic variable and, in general, must be read with each mention of precisely one mechatronic characteristic variable so that instead of one mechatronic characteristic variable, a plurality of mechatronic characteristic variables can also be determined, stored or otherwise processed or handled.

In the method proposed here for automatically generating a control program for a production machine or machine tool which is designed for diagnostic purposes, the following is provided for the purpose of determining at least one mechatronic characteristic variable of an axis of the machine: the control program is generated by means of an algorithm implemented in the form of a computer program using freely selectable parameters and/or machine-specific parameters. The freely selectable parameters also relate, of course, directly or indirectly to the machine or the respective axis and, for example, determine the duration of a run at a constant speed. The resulting, automatically generated control program defines a movement profile, namely a movement profile with at least one test run, for the respective machine axis. The at least one test run brings about an excitation of the machine and/or the axis suitable for determining at least one mechatronic characteristic variable of the axis. The fact that such a suitable excitation is produced is based on the algorithm using the aforementioned parameters for generating the control program and thus also for defining the movement profile coded in the form of the control program, resulting in, for example, travel movements with maximum speeds, maximum accelerations, etc. or a predetermined or predeterminable percentage of the maximum speed, maximum acceleration, etc.

In such a control program which can be executed during operation by a production machine or machine tool, in particular a control program in the form of an NC program, the movements of each machine axis are defined in such a way that a mechatronic characteristic variable can be automatically determined on the basis of generated measurement data.

In principle, in the case of all production machines or machine tools, their control programs are identical, that is to say, at least identically constructed, and comprise, for example, instructions for driving at a constant speed, instructions for acceleration operations, instructions for so-called micrometer steps and so forth. Therefore, an adaptation of the algorithm to different production machines or machine tools or their axes is easily possible, thus enabling the generation of control programs for basically any production machines or machine tools for exciting the respective machine axis for determining at least one mechatronic characteristic variable by means of the approach proposed here.

The advantage of the solution proposed here is that with automatically generated control programs with at least one axis-specific test run for exciting a machine axis of a respective production machine or machine tool of the aforementioned type solely for diagnostic purposes, namely for determining at least one mechatronic characteristic variable, an opportunity for creating an extensive database with mechatronic characteristic variables is established.

A respective value of the at least one mechatronic characteristic variable is a type of mechatronic fingerprint of the respective axis and permits a comparison of the axis, in particular a comparison of a state of an axis expressed by the value of a mechatronic characteristic variable, with other identical or comparable machine axes.

With a database with mechatronic characteristic variables, an opportunity arises for a qualified comparison, for example of two mechatronic characteristic variables recorded on different machines of the same type. In the case of a comprehensive database, for example, a mean value or some other statistically meaningful value can be determined for a mechatronic characteristic variable of a machine type and a mechatronic characteristic variable determined in a machine of the same type to be tested can be related thereto. Further details emerge from the parallel application with the title "Method and device for evaluating at least one mechatronic characteristic variable of a production machine or machine tool" (internal reference number of the applicant: 201625397), which is hereby also fully incorporated into the description presented here, also for the purpose of including features described in this parallel application in claims for defining the invention underlying the description presented here.

A further advantage of a control program generated according to the approach proposed here is that it is not tied to a specific machine control and its control software, thus enabling the performance of test runs and their evaluation for production machines and/or machine tools from a wide variety of manufacturers.

With respect to a device operating according to the method, the aforementioned object is achieved according to the invention by means of a device referred to hereinafter as a processing unit with the features of the parallel device claim. Advantageous embodiments result from an implementation of individual or multiple features of claim 1 and the claims based thereon.

For further description, in order to avoid unnecessary repetition, features and details apply which are described in connection with the method proposed here for automatically generating a control program for a production machine or machine tool which is solely designed for diagnostic purposes and any embodiments, of course also in connection with, and with regard to, the processing unit set up to perform the method and vice versa, so that the method can also be developed by means of one or more features of the method relating to steps carried out by the processing unit, and the processing unit can accordingly also be developed by means for executing steps carried out in the context of the method. Features and details which are described in connection with the method in question and any embodiments apply accordingly, of course also in connection with, and with regard to, the processing unit intended for the performance of the method and vice versa in each case, so that reference is or can always be made mutually to the disclosure of the individual aspects of the invention.

Advantageous embodiments of the invention are the subject of subclaims. References used within the claims indicate the further development of the subject of the claim referred to by the features of the respective dependent claim. They are not to be understood as a waiver of obtaining independent, objective protection for the features or combinations of features of a dependent claim. Furthermore, with regard to an interpretation of the claims and the description in a more detailed specification of a feature in a dependent claim, it is to be assumed that such a restriction in the respective preceding claims and a more general embodiment of the method in question/the device in question does not exist. Any reference in the description to aspects of dependent claims is therefore also to be expressly read without specific reference as a description of optional features. Finally, it should be noted that the method specified here can also be developed according to the dependent device claims and vice versa.

In an embodiment of the method, the movement profile defined in the form of the automatically generated control program comprises a plurality of test runs for determining a variety of mechatronic characteristic variables. Then, as part of the execution of an automatically generated control program, a plurality of mechatronic characteristic variables can be recorded.

In a further embodiment of the method, in different sections the movement profile comprises at least one test run for determining a respective mechatronic characteristic variable in each case. During a section of a resulting such movement profile, for example, the friction of the machine axis is recorded as a function of the speed travelled and a mechatronic characteristic variable characterizing the axis and the state thereof is determined therefrom. Another section of the movement profile permits, for example, the determination of faults in a ball screw drive when two measurement systems (motor measurement system and direct measurement system) are present on the axis. In another section, the axis stiffness can be determined as a mechatronic characteristic variable on the basis of acceleration jumps. In yet another section, the slack of the axis can be determined as the mechatronic characteristic variable and so on.

The aforementioned object is also achieved by a processing unit which operates according to the method as described here and hereinafter and for this purpose comprises means for performance of the method.

The method described here and hereinafter is preferably implemented in the form of a computer program with an algorithm for the purpose of automatic performance of the method by means of the processing unit. The invention is thus, on the one hand, also a computer program with program code instructions which can be executed by a computer and on the other hand, a storage medium with such a computer program, that is to say, a computer program product with program code means, as well as ultimately also a processing unit or a machine control of a production machine or machine tool in the memory of which such a computer program is or can be loaded as a means of performing the method and its embodiments.

If method steps or sequences of method steps are described hereinafter, this refers to actions which take place on the basis of the computer program or under the control of the computer program, unless expressly stated that individual actions are initiated by a user of the computer program. At least, any use of the term "automatic" means that the action in question takes place due to the computer program or under the control of the computer program.

Instead of a computer program with individual program code instructions, the method described here and hereinafter can also be carried out in the form of firmware. It will be apparent to a person skilled in the art that, instead of implementing a method in software, it is always also possible to use firmware or firmware and software or firmware and hardware. It is therefore to be understood that for the description presented here, the term software or the term computer program also encompasses other implementation possibilities, namely in particular, in firmware or in firmware and software or in firmware and hardware.

An exemplary embodiment of the invention is explained in more detail hereinafter with reference to the diagram. Corresponding objects or elements have the same reference characters in all the figures.

The exemplary embodiment is not to be understood as limiting the invention. Rather, in the context of the present disclosure, supplements and modifications are also entirely possible, in particular those which, for example, can be derived by a person skilled in the art with regard to the achievement of the object by combining or modifying individual features or steps in connection with the description part described in general or specifically and contained in the claims and/or the drawing and which lead to a new object or to new steps and/or sequences of steps by means of combinable features.

BRIEF DESCRIPTION OF THE DRAWING

In the drawings:
FIG. 3 shows an acceleration jump,
and
FIG. 4 shows a movement curve with acceleration jumps and constant speed runs.

DETAILED DESCRIPTION OF PREFERRED EMBODIMENTS

Figure 1:
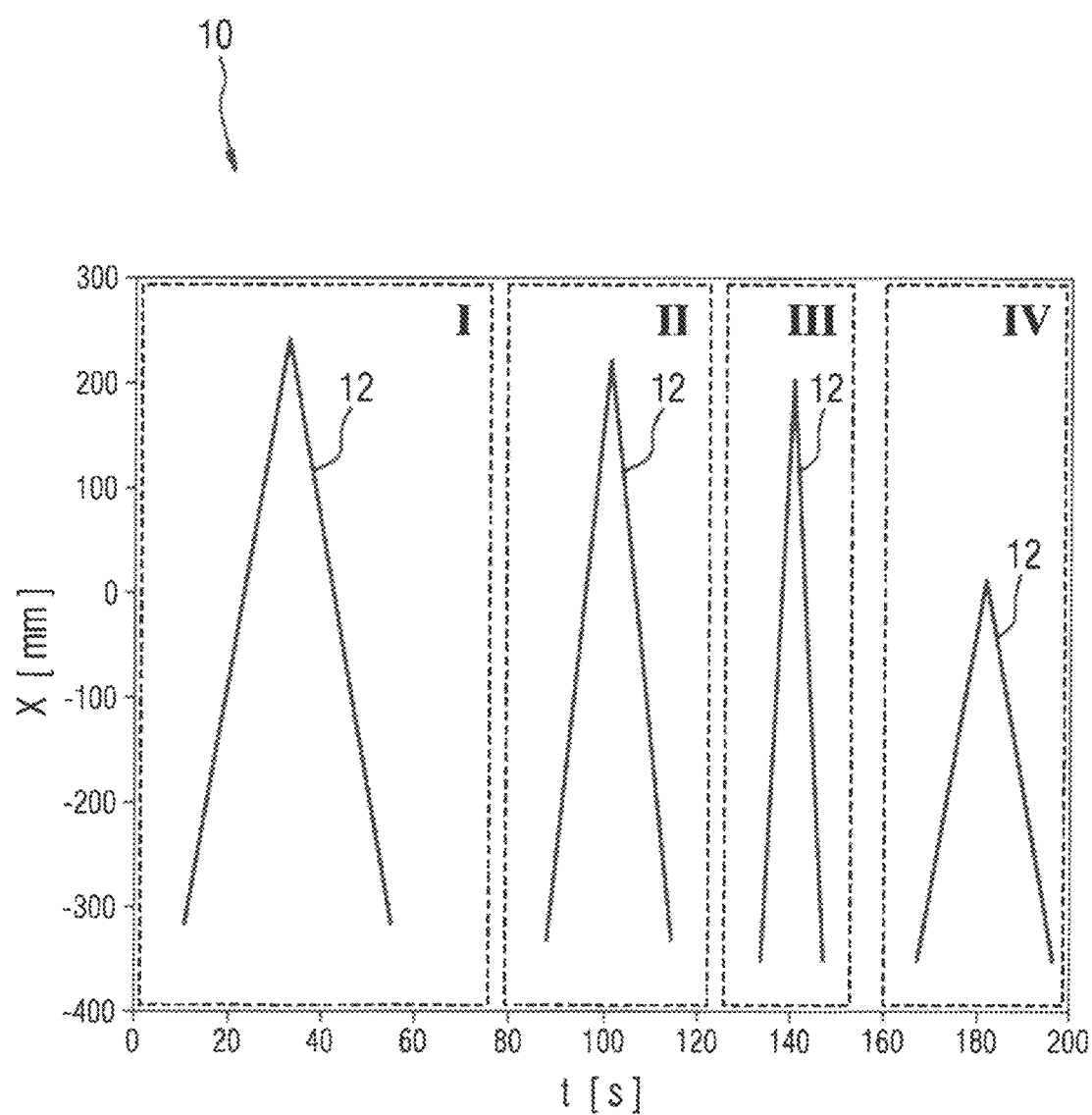
FIG. 1 shows a movement profile of a machine axis of a production machine or machine tool.

The illustration in FIG. 1 shows by way of example a movement profile 10 of an axis of, in principle, any production machine or machine tool not shown itself and known per se, in particular, of such a machine in the form of a machine tool, an industrial robot and the like (as aforementioned). The movement profile 10 comprises individual test runs 12 for the purpose of determining or evaluating mechatronic characteristic variables of the respective axis of the production machine or machine tool.

Such movement profiles 10 are currently being created manually if necessary. Individual sections of the movement profile 10, with the respective test runs 12 there, form the basis for determining different mechatronic characteristic variables of the axis or axes moved during the test run 12. In the example shown in FIG. 1, the movement profile 10 comprises a plurality of sections (I, II, III, IV), wherein in each section a test run 12 for determining a mechatronic characteristic variable or essentially a mechatronic characteristic variable takes place. The illustration of the test runs 12 shown is only to be understood as an example and in this respect the illustration in each section only shows one "outward journey" (plus run) and one "return journey" (minus run) of the respective feed axis.

In the situation shown in FIG. 1, the movement profile 10 comprises four sections by way of example. In principle, a movement profile 10 intended for determining mechatronic characteristic variables may comprise more or fewer than four sections. The movement profile 10 preferably comprises one section for each mechatronic characteristic variable to be determined, namely one section in which, by means of the test run 12 defined there, an excitation of the respective feed axis which is particularly favorable for determining the respective mechatronic characteristic variable takes place.

In practice, the design of such test runs 12 is dependent on the mechatronic characteristic variables to be determined and individual axis properties. This relationship is shown schematically simplified in FIG. 2.

The mechatronic characteristic variables to be determined are, in particular, the characteristic variable "friction", the characteristic variable "rigidity" and the characteristic variable "slack". An optional further mechatronic characteristic variable describes a fault in a ball screw drive (KGT).

Figure 2:
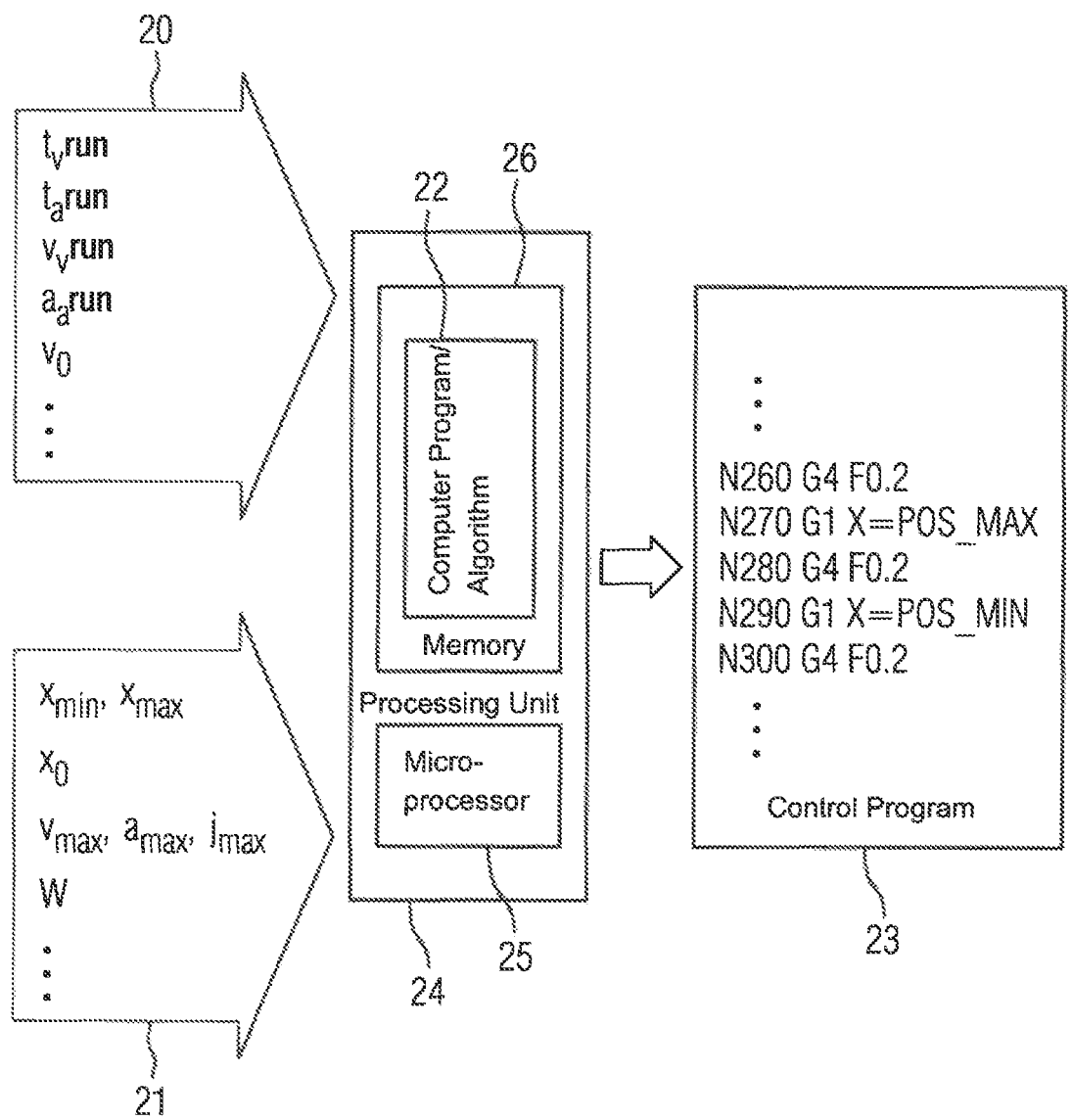
FIG. 2 shows a schematically simplified overview of the approach proposed here.

The illustration in FIG. 2 shows freely selectable parameters 20 and machine-specific parameters 21 as input data for an algorithm 22 for generating a control program 23 for a respective machine, in particular, for generating a control program 23 in the form of an NC program.

In order to execute the algorithm 22 and to generate the control program 23 in the context of the execution of the algorithm 22, a processing unit 24 is provided. In a manner in principle known per se, this comprises a microprocessor 25 or the like and a memory 26 into which the algorithm 22 can be loaded in the form of or as part of a computer program 22 and is loaded during operation of the processing unit 24. The processing unit 24 may be part of the machine control of the respective machine, such that the processing unit 24 uses a microprocessor or the like of the machine control for the execution of the algorithm 22 and a part of a memory of the machine control of the production machine or machine tool as the memory. The processing unit 24 may also be independent of the respective machine and its machine control, such that by means of the processing unit 24, a control program 23 is occasionally generated or modified for the respective machine and this is loaded into the memory of the machine control of the machine in a manner which is in principle known per se.

The freely selectable parameters 20 include, for example, a duration of a run at constant speed (constant speed run) symbolically denoted by $t_{vrun}$. The duration is given in seconds, for example. Furthermore, in the illustration in FIG. 2 a duration of a run at constant acceleration (constant acceleration run) symbolically denoted by $t_{arun}$, a speed of a constant speed run symbolically denoted by $v_{vrun}$ and an acceleration of a constant acceleration run symbolically denoted by $a_{arun}$ are shown as freely selectable parameters 20. The duration ($t_{vrun}$, $t_{arun}$) is given in seconds. The speed ($v_{vrun}$) is given in m/s (meters per second). The acceleration ($a_{arun}$) is given in m/s$^2$. The freely selectable and thus predeterminable parameters 20 also include an initial speed $V_0$ given in m/s (meters per second) at the time t=0. The freely selectable parameters 20 are determined, for example, by specialists, in particular by specialists of a manufacturer of a respective machine or machine axis.

Optionally, the machine-specific parameters 21 are automatically read from a machine control (not shown) of the respective machine (production machine or machine tool). The machine-specific parameters 21 include, in particular, the travel limits of the respective machine axis symbolically denoted by $x_{min}$, $x_{max}$: maximum values with regard to speed, acceleration and jerk ($v_{max}$, $a_{max}$, $j_{max}$), an active zero offset $x_0$ and a respective active tool W.

In brief, a control program 23 for a respective machine is automatically generated by specifying at least one test run 12 based on the freely selectable parameters 20 and the machine-specific parameters 21 for each mechatronic characteristic variable to be determined, leading to an excitation of the respective machine axis which is particularly favorable for determining the respective mechatronic characteristic variable. In the automatically generated control program 23, a test run 12 for determining the mechatronic characteristic variable "rigidity" (test run 12 for rigidity determination) is defined, inter alia, for example by a maximum acceleration that occurs during the test run 12. Furthermore, such a test run 12 is defined in the automatically generated control program 23 by the path length to be travelled. These parameters of a test run 12 are the result of algebraic arithmetic operations which are part of the algorithm 22. By means of the algorithm 22, the aforementioned maximum acceleration during the test run 12 for rigidity determination and the path length to be travelled are thus determined on the basis of the freely selectable parameters 20 and/or the machine-specific parameters 21. Furthermore, the determined results are converted into program code instructions of the automatically generated control program 23 by means of the algorithm 22 so that when the control program 23 is executed on a machine suitable for this purpose, a test run 12 with the determined path length and the determined acceleration results. For other mechatronic characteristic variables this applies accordingly, for example, for determining a maximum path length of a test run 12 for friction determination or determination of a maximum possible number of acceleration jumps of a test run 12 for rigidity determination.

By way of example, the determination of a maximum possible number of acceleration jumps during a test run 12 is described hereinafter with reference to the illustrations in FIG. 3 and FIG. 4.

For an individual acceleration jump—reference number 30—, as shown by way of example in FIG. 3, and from short, constant returns with the maximum possible jerk J (J=$j_{max}$) of the respective axis (in m/s$^3$) and an acceleration phase of the length T (T=$t_{arun}$), the path $X_{jump}$ is produced:

$$X_{jump}=((A+JT)\cdot(2A^2+JAT+2JV_0))/J^2$$

In addition to the acceleration jump 30, the illustration in FIG. 3 shows—in each case plotted over the time t—the underlying jerk profile 32 as well as a resulting speed profile 34 and the movement curve 36 of an individual acceleration jump.

Overall, however, a predetermined or predeterminable number N of acceleration jumps of the type shown in FIG. 3 are to be moved one after the other, wherein before and after each acceleration jump a constant speed run, in particular, a slow constant speed run, takes place for the purpose of obtaining the prestressing of the drive train. A resulting movement curve 40 (FIG. 4) therefore comprises N acceleration jumps and N+1 constant speed runs in total.

With the movement curve 40, the illustration in FIG. 4 shows an enlarged section from the movement profile 10 according to FIG. 1, the time being plotted on the abscissa and the path in millimeters on the ordinate. In the further illustrations in FIG. 4, the speed V—reference number 42—in mm/s and the acceleration A—reference number 44—in mm/s$^2$ are shown below the movement curve 40 and above the same time base.

The total displacement $X_{total\,path}$ for N acceleration jumps is:

$$X_{total\,path} = (t_{vrun} \cdot v_{vrun} \cdot (N+1)) + N \cdot X_{jump}$$

$$= (t_{vrun} \cdot v_{vrun} \cdot (N+1)) + N((A+JT)\cdot(2A^2 + JAT + 2JV_0))/J^2$$

Solved for N, a maximum number $N_{max}$ of possible acceleration jumps for a limited travel distance $X_{max}$ of a specific machine axis is obtained:

$$N_{max}=(X_{max}-t_{vrun}\cdot v_{vrun})/(t_{vrun}\cdot v_{vrun}+((A+JT)\cdot(2A^2+JAT+2JV_0))/J^2)$$

If $N_{max}$ is not an integer, rounding off takes place.

The calculations described as well as the final determination of the maximum possible number $N_{max}$ of possible acceleration jumps within the given travel distance $X_{max}$ are executed according to the algorithm 22 by means of a processing unit 24 executing the algorithm 22 and the processing unit 24 is designed and set up by means of the algorithm 22/computer program 22 loaded into the memory 26 to carry out these calculations and determinations.

With the data thus calculated by means of the algorithm 22—likewise by means of the algorithm 22—a control program 23 for a machine axis of a production machine and/or machine tool can be generated. In the case of a production or machine tool having a plurality of machine axes, the algorithm 22 can of course be performed for each individual machine axis or individual machine axes or a group of machine axes.

When executing a control program 23 automatically generated by means of the algorithm 22 on a respective machine (production machine or machine tool), measured values are recorded by means of a sensor system in principle known per se and/or by reading out characteristic values, for example current and/or voltage, from a drive control of the machine or a machine axis on the basis of which the determination of at least one mechatronic characteristic variable is possible.

Although the invention has been illustrated and described in detail by the exemplary embodiment, the invention is not limited by the disclosed examples and other variations can be derived therefrom by a person skilled hi the art without departing from the scope of protection of the invention.

Prominent individual aspects of the description submitted here can thus be summarized briefly as follows: a method and a device which operates according to the method for automatically generating a control program 23 for a production machine or machine tool which is designed for diagnostic purposes is disclosed. The control program 23 is generated by means of an algorithm 22 using freely selectable parameters 20 and/or machine-specific parameters 21. The resulting, automatically generated control program 23 defines a movement profile 10, namely a movement profile 10 with at least one test run 12, for at least one axis of the respective production machine or machine tool. The at least one test run 12 produces an excitation of this axis which is suitable for determining at least one mechatronic characteristic variable of the respective axis. The automatically generated control program 23 is thus the basis for a mechatronic machine analysis which is practically not able to be performed, at least not able to be performed in an economically reasonable manner, without such automatically generated control programs 23 and the mechatronic characteristic variables obtainable thereby.

What is claimed is:

1. A method for automatically generating a control program, which is designed for diagnostic purposes, for a production machine or machine tool, the method comprising:
    generating the control program with an algorithm which comprises freely selectable parameters or machine-specific parameters, or both;
    defining with the automatically generated control program a movement profile for at least one test run for at least one axis of the respective production machine or machine tool:
    producing with the at least one test run an axis excitation of the at least one axis suitable for determining at least one mechatronic characteristic variable of the at least one axis, and
    determining a number of acceleration jumps along a predetermined limited travel distance for the at least one test run;
    wherein the at least one test run comprises the determined number of acceleration jumps and a constant speed travel before and after each acceleration jump.

2. The method of claim 1, wherein the at least one test run comprises travel movements having a maximum machine-specific speed or a maximum machine-specific acceleration.

3. The method of claim 1, wherein the movement profile comprises a plurality of test runs for determining different mechatronic characteristic variables.

4. The method of claim 3, wherein the movement profile comprises different sections having each at least one test run for determining a respective mechatronic characteristic variable.

5. A processing unit designed to automatically generate a control program for diagnostic purposes of a production machine or machine tool, comprising:
    a microprocessor, and
    a memory,
    wherein a computer program, when loaded into the memory and executed by the microprocessor, causes the processing unit to receive freely selectable parameters or machine-specific parameters, or both, and generate therefrom the control program which
    defines a movement profile with at least one test run for at least one axis of the respective production machine or machine tool;
    produces with the at least one test run an axis excitation of the at least one axis suitable for determining at least one mechatronic characteristic variable of the at least one axis, and
    determines a number of acceleration jumps along a predetermined limited travel distance for the at least one test run;
    wherein the at least one test run comprises the determined number of acceleration jumps and a constant speed travel before and after each acceleration jump.

6. A computer program embedded in a non-transitory storage medium and having program code, which when loaded into a memory of a processing unit of a production machine or machine tool and executed by a microprocessor of the processing unit, causes the processing unit to receive freely selectable parameters or machine-specific parameters, or both, and generate therefrom the control program which
    defines a movement profile with at least one test run for at least one axis of the respective production machine or machine tool;
    produces with the at least one test run an axis excitation of the at least one axis suitable for determining at least one mechatronic characteristic variable of the at least one axis, and
    determines a number of acceleration jumps along a predetermined limited travel distance for the at least one test run;
    wherein the at least one test run comprises the determined number of acceleration jumps and a constant speed travel before and after each acceleration jump.

7. A computer program product comprising program code embedded in a non-transitory storage medium, which program code, when loaded into a memory of a processing unit of a production machine or machine tool and executed by a microprocessor of the processing unit, causes the processing unit to receive freely selectable parameters or machine-specific parameters, or both, and generate therefrom the control program which
    defines a movement profile with at least one test run for at least one axis of the respective production machine or machine tool;
    produces with the at least one test run an axis excitation of the at least one axis suitable for determining at least one mechatronic characteristic variable of the at least one axis, and
    determines a number of acceleration jumps along a predetermined limited travel distance for the at least one test run;
    wherein the at least one test run comprises the determined number of acceleration jumps and a constant speed travel before and after each acceleration jump.

* * * * *